US 9,021,427 B2

(12) United States Patent
Liu et al.

(10) Patent No.: US 9,021,427 B2
(45) Date of Patent: Apr. 28, 2015

(54) CONVERSION METHODS OF APPLICATIONS OF MOBILE DEVICES AND MOBILE DEVICES AND SYSTEMS USING THE SAME

(75) Inventors: Bo-Fu Liu, Tainan (TW); Yu-Ting Lin, Chiayi (TW); Shih-Chun Chou, Taipei (TW); Jih-Yiing Lin, Zhuqi Township, Chiayi County (TW)

(73) Assignee: Institute for Information Industry, Taipei (TW)

( * ) Notice: Subject to any disclaimer, the term of this patent is extended or adjusted under 35 U.S.C. 154(b) by 305 days.

(21) Appl. No.: 13/488,129

(22) Filed: Jun. 4, 2012

(65) Prior Publication Data

US 2013/0145346 A1 Jun. 6, 2013

(30) Foreign Application Priority Data

Dec. 6, 2011 (TW) .............................. 100144788 A (51) Int. Cl.
 *G06F 9/44* (2006.01)
 *G06F 9/45* (2006.01)
(52) U.S. Cl.
 CPC .. *G06F 8/51* (2013.01); *G06F 8/76* (2013.01); *G06F 9/4443* (2013.01)
(58) Field of Classification Search
 USPC ......................................................... 717/113
 See application file for complete search history.

(56) References Cited

U.S. PATENT DOCUMENTS

| | | | | |
|---|---|---|---|---|
| 6,212,550 | B1 * | 4/2001 | Segur ............................ | 709/206 |
| 7,779,408 | B1 * | 8/2010 | Papineau ...................... | 717/178 |
| 8,402,432 | B2 * | 3/2013 | Shenfield et al. ............. | 717/114 |
| 8,650,480 | B2 * | 2/2014 | Sahota et al. ................. | 715/234 |
| 2003/0084120 | A1 * | 5/2003 | Egli .............................. | 709/218 |
| 2004/0093587 | A1 * | 5/2004 | Sesma ........................... | 717/118 |
| 2004/0103114 | A1 * | 5/2004 | Sesma ....................... | 707/103 R |
| 2005/0172282 | A1 * | 8/2005 | Shenfield et al. ............. | 717/174 |
| 2008/0244560 | A1 | 10/2008 | Neagu et al. | |
| 2009/0164951 | A1 | 6/2009 | Kumar | |
| 2009/0271501 | A1 * | 10/2009 | Shenfield et al. ............. | 709/219 |

(Continued)

FOREIGN PATENT DOCUMENTS

| | | |
|---|---|---|
| CN | 102184101 | 9/2011 |
| TW | 200426786 | 12/2004 |
| TW | 200427258 | 12/2004 |

OTHER PUBLICATIONS

Sacramento et al., MOCA: A Middleware for Developing . . . , Oct. 2004, IEEE, pp. 1-14.*

(Continued)

*Primary Examiner* — John Chavis
(74) *Attorney, Agent, or Firm* — McClure, Qualey & Rodack, LLP (57) ABSTRACT

A conversion method of applications of mobile devices is provided. The method includes the steps of obtaining a device feature information and a platform information of a mobile device, modifying, by a convertor, a first description data of a first application according to the obtained device feature information and platform information, and converting the modified first application to a second application in which the first application is represented by a platform-neutral language and at least includes the first description data for describing the interaction design of a user interface, and the second application is represented by a language corresponding to the platform information and can be executed on the mobile device.

20 Claims, 7 Drawing Sheets

(56) References Cited

U.S. PATENT DOCUMENTS

| | | | |
|---|---|---|---|
| 2010/0174974 A1 | 7/2010 | Brisebois et al. | |
| 2010/0281475 A1 | 11/2010 | Jain et al. | |
| 2011/0010613 A1* | 1/2011 | Shenfield et al. | 715/234 |
| 2011/0154287 A1* | 6/2011 | Mukkamala et al. | 717/105 |
| 2011/0191667 A1* | 8/2011 | Sahota et al. | 715/234 |
| 2012/0227059 A1* | 9/2012 | Fleming | 719/318 |
| 2013/0007698 A1* | 1/2013 | Warila et al. | 717/106 |
| 2013/0124466 A1* | 5/2013 | Naidu et al. | 707/610 |
| 2014/0365869 A1* | 12/2014 | Warila et al. | 715/234 |

OTHER PUBLICATIONS

Taiwanese language office action dated Apr. 22, 2014.
English language translation of abstract of TW 200426786 (published Dec. 1, 2004).
English language translation of abstract of TW 200427258 (published Dec. 1, 2004, p. 3 of publication).
English language translation of abstract of CN 102184101 (published Sep. 14, 2011).

* cited by examiner

CONVERSION METHODS OF APPLICATIONS OF MOBILE DEVICES AND MOBILE DEVICES AND SYSTEMS USING THE SAME

CROSS REFERENCE TO RELATED APPLICATIONS

This Application claims priority of Taiwan Application No. 100144788, filed on Dec. 6, 2011, and the entirety of which is incorporated by reference herein.

BACKGROUND OF THE INVENTION

1. Field of the Invention

The disclosure relates generally to conversion methods of applications of mobile devices and mobile devices and systems using the same, and, more particularly to conversion methods of applications of mobile devices and mobile devices and systems using the same for cross-platform mobile applications which automatically adapt the interaction design of the user interface of the mobile device application according to the device features of a mobile device.

2. Description of the Related Art

Recently, portable devices, such as mobile or handheld devices, have become more and more technically advanced and multifunctional. For example, a mobile device may receive email messages, have an advanced address book management application, provide media playback function, and have various other functions. Because of the conveniences of devices with multiple functions, the devices have become necessities of life.

Users may download various applications (APPs) to the mobile device to increase functionalities and performance of the mobile device. To provide better user experience for the user, the applications often require utilizing various user interaction units provided by the mobile device. For example, the user interface may provide an input means by utilizing sensors, such as a shaking sensor, an accelerometer, a Gyroscope and so on, or by sensors with specific functions within the platform such as microphone and speech recognition functions. The applications may also allow the users to utilize output devices of the mobile device, such as vibration device, speaker and display device, for output, so as to provide a diversity of interaction effects. However, as currently there are a lot of kinds of mobile devices, interaction devices equipped and platform used therein for different mobile devices may also be different. Thus, application developers have to know the interaction devices and the platform of a specific mobile device in advance to plan proper operations of its user interface so as to develop mobile applications suitable for the specific mobile device. For different mobile devices with different interaction devices or platforms, the application developers may need to re-develop a new application suitable for the device capabilities of the target mobile device, thus, causing inconvenient and costly development cost. For example, if an application utilizes specific sensor signals as an input, e.g. a vibration or a touch signal from a touch-panel or the like which is utilized to serve as the interaction means of the user interface, this application can not be used on a mobile device when it does not have the vibration sensor and the touch-panel. With the increasing types of sensors for mobile devices in the market, the developers have to develop multiple versions of mobile applications to match the different capabilities of mobile devices equipped with different interaction devices or have to revise the application one by one for each mobile device.

Moreover, in order to re-develop or revise the applications to adapt to each kind of mobile devices, in addition to the required development of application, communications between different developers of different specialties, such as the market sales, designers, editors and code programmers, are also required, resulting in time consuming and labor intensive in development. Therefore, it is desire to provide a tool capable of rapidly generating applications suitable for different target platforms.

BRIEF SUMMARY OF THE INVENTION

Conversion methods of applications of mobile devices and mobile devices and systems using the same are provided.

An embodiment of a conversion method of applications of mobile devices comprises the steps of obtaining a device feature information and a platform information of a mobile device; and modifying, by a convertor, a first description data of a first application according to the obtained device feature information and platform information and converting the modified first application to a second application, wherein the first application is represented by a platform-neutral language and at least includes the first description data describing the interaction design of a user interface, and the second application is represented by a language corresponding to the platform information and can be executed to generate the user interface on the mobile device.

In one embodiment, the conversion method is applied on a mobile device which is connected to a server and the step of obtaining the device feature information and the platform information of the mobile device is performed by the mobile device, wherein the converter and the first application are transmitted from the server to the mobile device, and the mobile device executes the converter to modify the first description data and convert the first application to the second application.

In another embodiment, the conversion method is applied on a mobile device which is connected to a server and the step of obtaining the device feature information and the platform information of the mobile device is performed by the mobile device, wherein the obtained device feature information and the platform information of the mobile device are transmitted to the server, and the server executes the converter to modify the first description data and converts the first application to the second application and transmits the second application to the mobile device.

Another embodiment of a mobile device capable of converting applications thereof comprises a communication module for connecting to a server via a wireless communication network; and a controller module for obtaining a device feature information and a platform information of the mobile device, receiving a converter and a first application containing a first description data from the server via the communication module, executing the converter to modify the first description data of the first application according to the obtained device feature information and platform information, and converting the modified first application to a second application, wherein the first application is represented by a platform-neutral language and at least includes the first description data describing the interaction design of a user interface, and the second application is represented by a language corresponding to the platform information and can be executed to generate the user interface on the mobile device.

Another embodiment of a system which is capable of converting a mobile device application comprises a communication module for connecting to a mobile device via a communication network for obtaining a device feature information and a platform information of the mobile device; and a server controlling module for executing a converter to modify a first description data of a first application according to the obtained device feature information and platform information, converting the modified first application to a second application and transmitting the second application to the mobile device, wherein the first application is represented by a platform-neutral language and at least includes the first description data describing the interaction design of a user interface, and the second application is represented by a language corresponding to the platform information and can be executed to generate the user interface on the mobile device.

Another embodiment of a mobile application development system for generating an application and providing the application to a mobile device comprises: a communication module for connecting to the mobile device via a communication network; an editor for generating a first application, wherein the first application is represented by a platform-neutral language and at least includes the first description data describing the interaction design of a user interface; and a converter for modifying the first description data of the first application according to a device feature information and a platform information of the mobile device and converting the modified first application to a second application, wherein the second application is represented by a language corresponding to the platform information and can be executed to generate the user interface on the mobile device.

Conversion methods of applications of mobile devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. The invention can be used in any mobile device with sensors, such as, a smart phone, a tablet computer, a mini-notebook, a laptop computer, a PDA (Personal Digital Assistant) and so on, however, it is to be understood that the invention is not limited thereto.

Figure 1:
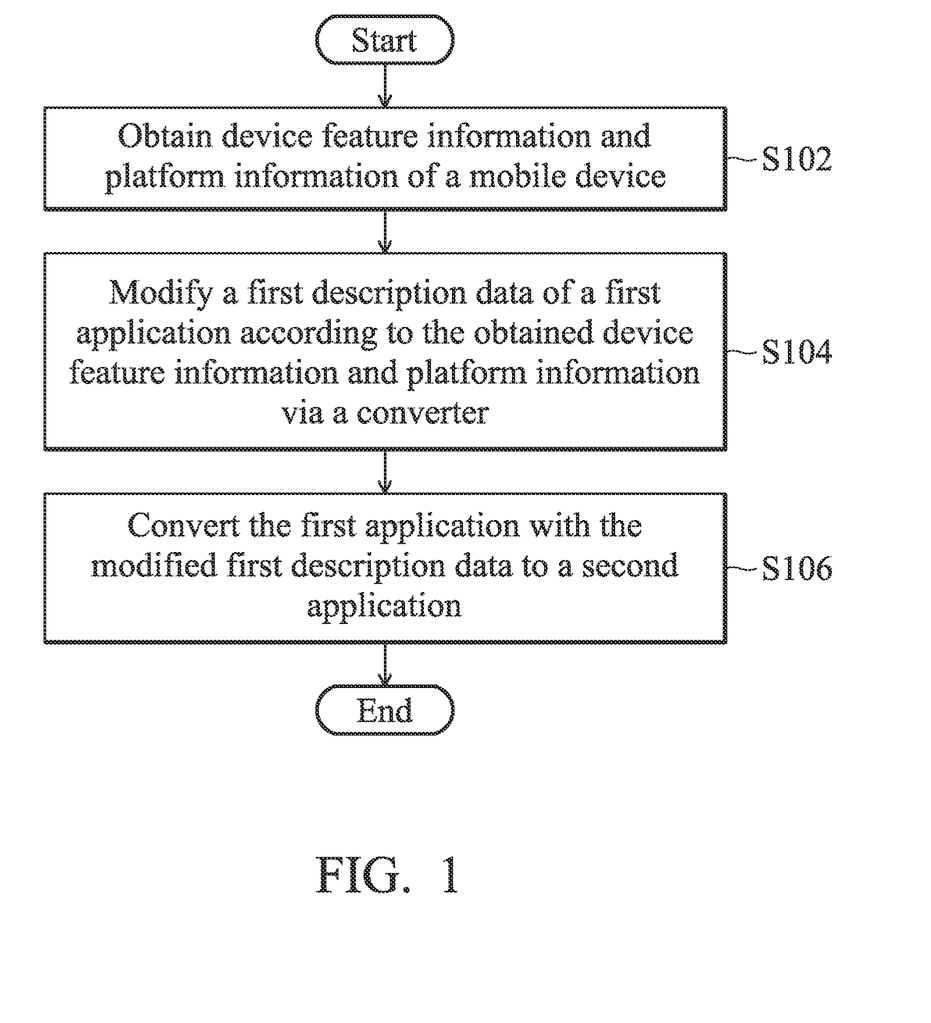
FIG. 1 is a flowchart of an embodiment of a conversion method of applications of mobile devices of the invention.

In first embodiment, please refer to FIG. 1, which is a flowchart of an embodiment of a conversion method of applications of mobile devices of the invention. The method comprises the following steps.

In step S102, device feature information and platform information of a mobile device are obtained. In this step, the device feature information may comprise information about sensors of mobile devices, functionalities provided on the mobile devices or input/output signals of a user interface on the mobile devices, such as vibration signals, shaking signals, flicking signals, keypads signals, touch signals, voices (beeps) and so on. The platform information may be information regarding types/versions of operation system (OS) installed on the mobile devices, the programming language of the mobile devices or the like.

In step S104, a first description data of a first application is modified according to the obtained device feature information and platform information via a converter. In this step, the first application is presented by a platform-neutral language, e.g. HTML, XML, Protocol Buffer, and can be applied in various platforms, wherein the platform and the OS to be applied to are not limited. The application at least includes the first description data which describes a user interaction design of the user interface that is generated when the application is executed on the mobile device. For example, the first description data may describe that the user interface can receive a shaking signal as an input signal and send a voice signal as an output signal.

In step S106, the first application with the modified first description data is converted to a second application. In this step, the second application is presented by a native language corresponding to the platform information of the mobile device and can be executed on the mobile device to generate the user interface.

The above-mentioned embodiments may be implemented by a server and a mobile device which are connected through a network communication link. In one implementation, the conversion method may be performed by the mobile device and the device feature information and the platform information of the mobile device may be automatically obtained by the mobile device. For example, the mobile device may have the device feature information and the platform information stored, or that information may be obtained by the mobile device automatically after the mobile device performs auto device detection. The converter and the first application may be transmitted from the server to the mobile device and the mobile device may then execute the converter to modify the first description data and convert the first application to the second application. In another implementation, the conversion method may be performed by the server. In this case, the mobile device first obtains the device feature information and the platform information of the mobile device and then transmits them to the server. The server then executes the converter to modify the first description data and convert the first application to the second application and then transmits the second application to the mobile device.

Further, in the embodiment that the converter is executed by the mobile device, various implementations may be presented when the mobile device executes the converter to convert the first application to the second application. For example, the mobile device may convert the first application to the second application at a proper time upon reception of the converter and the first application. In another example, the mobile device may first store the converter and the first application and then utilize the converter to convert the first application to the second application and execute the second application when it attempts to execute the second application.

In the embodiments, the first application and the second application may be presented by the same or different programming language or may be presented by different levels of programming languages of the same program (e.g. high level languages or machine codes). In addition, the first application may be an application that is applicable by the mobile device, computer or other electronic devices, and it may be executed in various manners. For example, the first application may be executed by the mobile device, computer or other electronic devices after it is interpreted by an interpreter corresponding to the first application or it may first be compiled by a compiler corresponding to the first application to generate an executable program code such that it may later be executed by the mobile device, computer or other electronic devices. Similarly, the second application may be an application that is applicable by the mobile device, computer or other electronic devices, and it may be interpreted by an interpreter corresponding to the second application or it may be compiled by a compiler corresponding to the second application. When the first application and the second application are of the same programming language, the first application and the second application may share the same interpreter or compiler. In a specific embodiment, the interpreter or compiler may further be integrated with the aforementioned converter, i.e. the converter may further contain the functionality of the interpreter or compiler.

Figure 2:
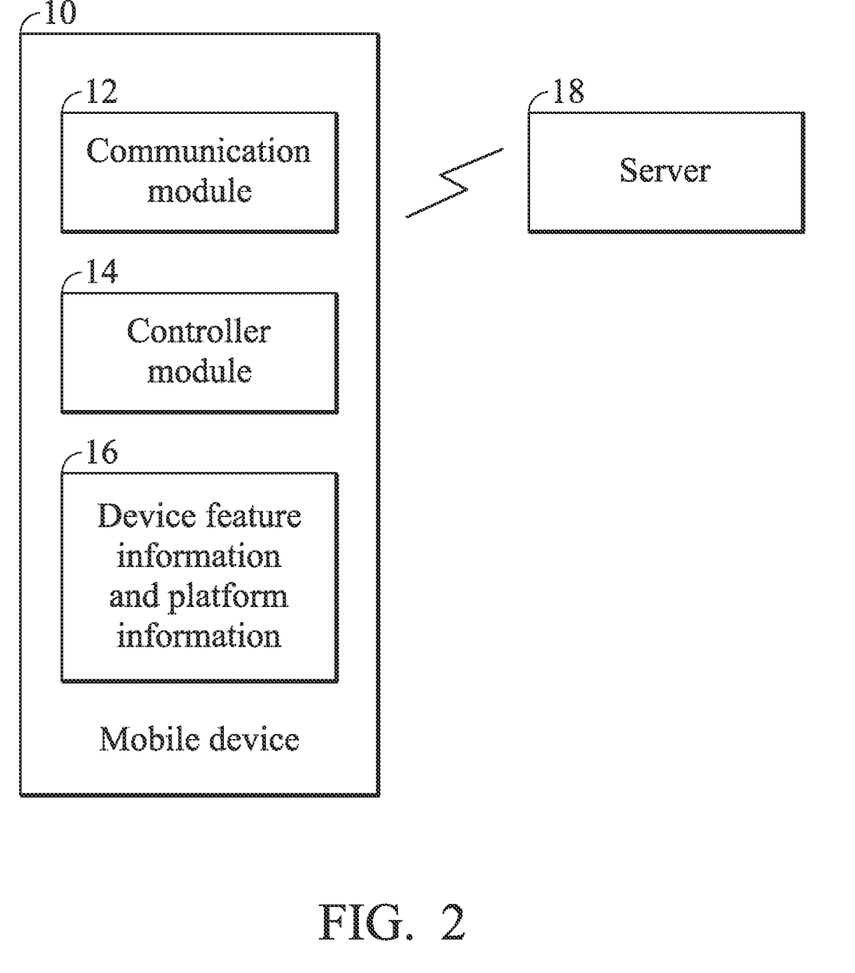
FIG. 2 is a schematic diagram illustrating an embodiment of a mobile device capable of converting applications of mobile devices of the invention.

FIG. 2 is a schematic diagram illustrating an embodiment of a device architecture of a mobile device 10 capable of converting applications of mobile devices of the invention. The mobile device 10 comprises a communication module 12 and a controller module 14. The communication module 12 is mainly linked to a server 18 via a wired or wireless communication network, preferably via a wireless communication network, such as 3G, GSM, CDMA, PHS or WiFi network, but the invention is not limited thereto. The controller module 14 is used for obtaining device feature information and platform information 16 of the mobile device 10, receiving a converter and a first application containing a first description data from the server 18 via the communication module 12, executing the converter to modify the first description data of the first application according to the obtained device feature information and platform information 16 and convert the first application with the modified first description data to a second application. The device feature information and platform information 16 may be stored in a storage unit of the mobile device 10, e.g. memory units, SIM cards, memory cards, hard disks and so on. As previously described, the first application is presented by a platform-neutral language and at least includes the first description data describing the user interaction design of a user interface, and the second application presented by a language corresponding to the platform information may be executed to generate the user interface on the mobile device 10.

Figure 3:
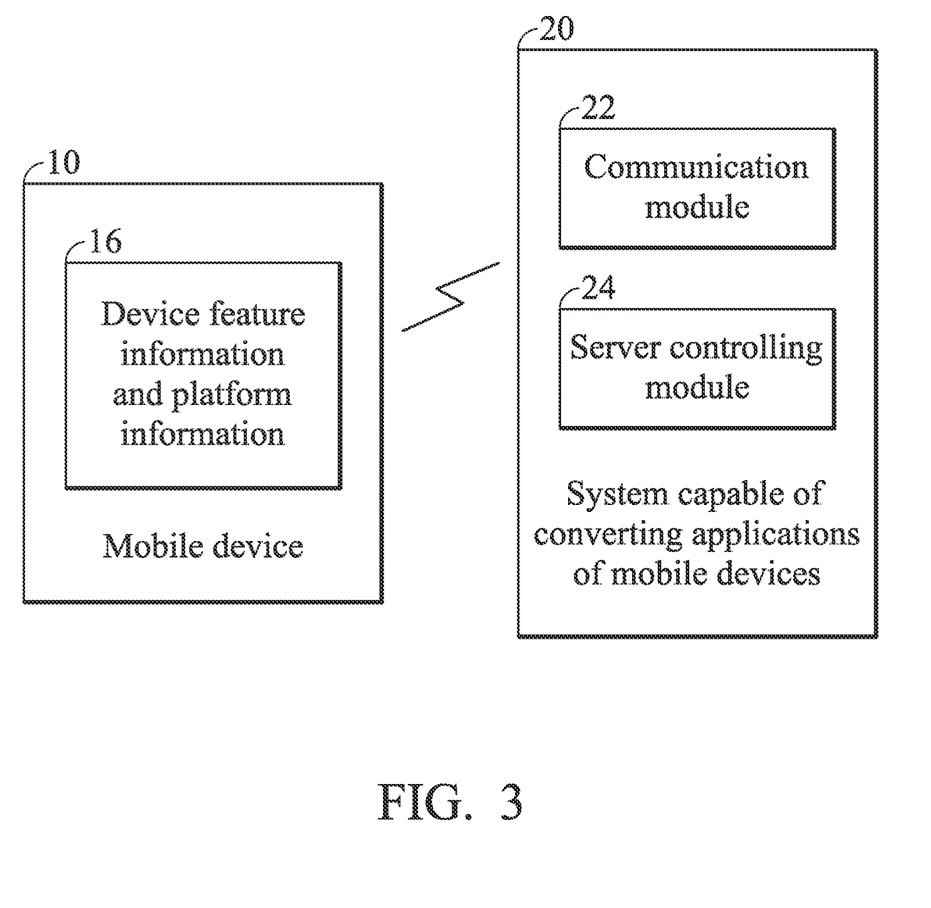
FIG. 3 is a schematic diagram illustrating an embodiment of a system capable of converting applications of mobile devices of the invention.

FIG. 3 is a schematic diagram illustrating an embodiment of a system 20 capable of converting applications of mobile devices of the invention. The system 20 mainly includes a communication module 22 and a server controlling module 24. The communication module 22 is mainly linked to the mobile device 10 to obtain the device feature information and platform information 16 of the mobile device 10 via a wired or wireless communication network, preferably via a wireless communication network, such as 3G, GSM, CDMA, PHS or WiFi network, but the invention is not limited thereto. The device feature information and platform information 16 may be stored in a storage unit of the mobile device 10, e.g. memory units, SIM cards, memory cards, hard disks and so on, and then may be transmitted to the system 20 capable of converting applications of mobile devices for subsequent use by the server controlling module 24. Furthermore, the system 20 capable of converting applications of mobile devices may further include a database for storing the device feature information of the mobile device 10. The server controlling module 24 is used for executing the converter to modify a first description data of a first application according to the obtained device feature information and platform information 16, converting the modified first application to a second application and then transmitting the second application to the mobile device 10. The first application, the first description information and the second application are the same as previously described and thus are omitted here for brevity.

The system 20 capable of converting applications of mobile devices of the invention may further perform the conversion of the applications of mobile devices based on the transformation rules and the device feature information/platform information and serve as a mobile application development system. In this embodiment, the first description information of the first application describes the user interaction design of the user interface, and the first application may further consist of intermediate description files for describing its views and resources, in which the intermediate description files may be stored in a single file or may be stored in a plurality of files. In some embodiments, the mobile device 10 may automatically detect which sensors or user interface relevant devices are provided on the target mobile device and then accordingly modify the user interaction design of the user interface described in the first application to a new user interaction design of the user interface tailored to the capability of the target device according to the transformation rules and the device feature and platform information. Thereafter, the mobile device 10 may convert the first application which contains the first description information (i.e. the user interaction design), the view description information and the resources description information with modified contents into the second application that is applicable on the target mobile device.

Figure 4:
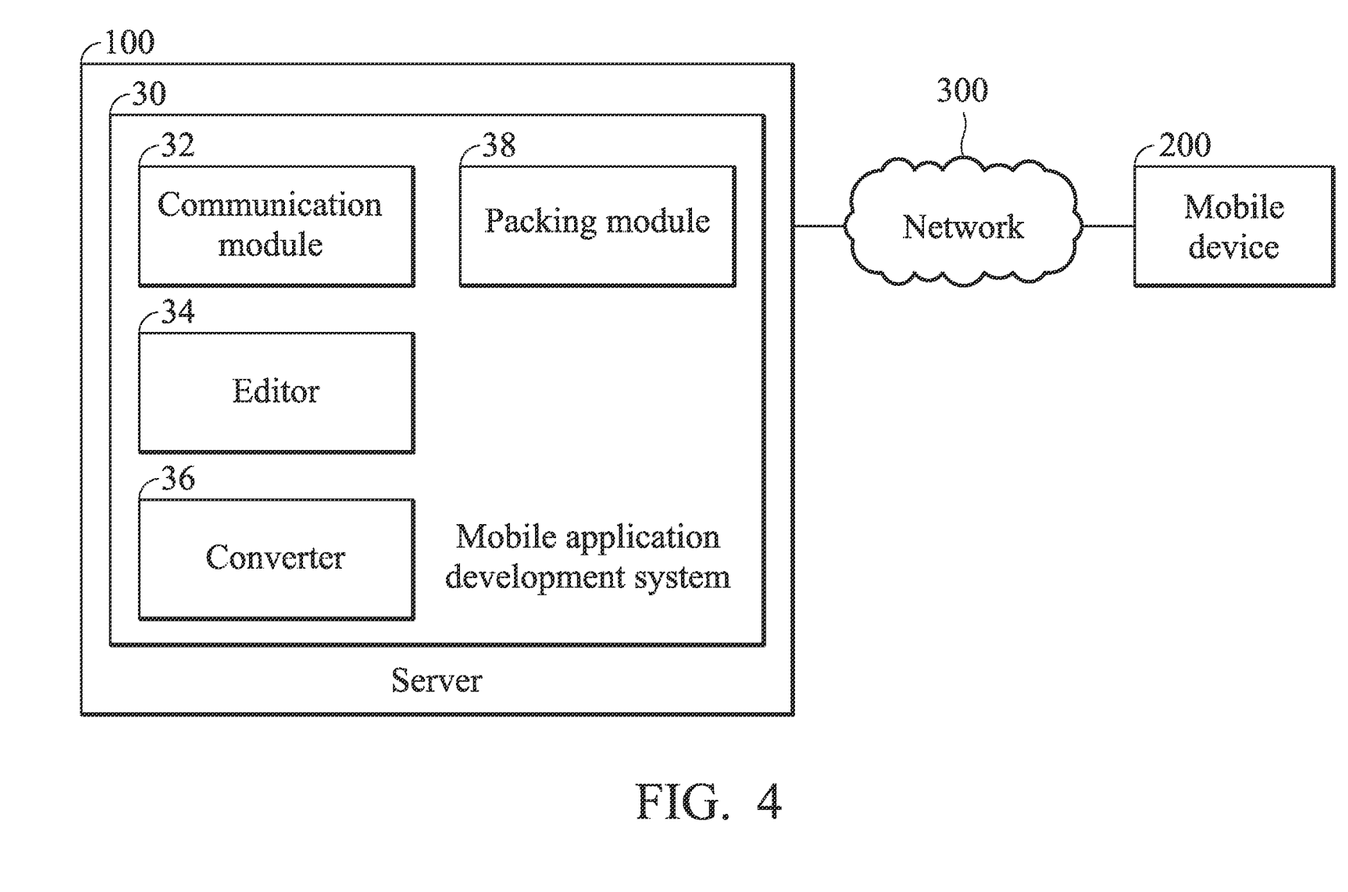
FIG. 4 is a schematic diagram illustrating an embodiment of a mobile application development system of the invention.

FIG. 4 is a schematic diagram illustrating another embodiment of a mobile application development system 30 of the invention. The mobile application development system 30 may be configured on a server 100, which mainly includes a communication module 32, an editor 34 and a converter 36. The communication module 32 is used for connecting to a mobile device 200 via the communication network 300. The editor 34 is used for generating a first application, wherein the first application is presented by a platform-neutral language and at least includes the first description data describing the user interaction design of a user interface. The converter 36 is used for modifying the first description data of the first application according to the device feature information and platform information of the mobile device and converting the modified first application to a second application, wherein the second application is presented by a language corresponding to the platform information and can be executed to generate the corresponding user interface on the mobile device. In addition, the mobile application development system 30 may further include a packing module 38 for packing the converter 36 and the first application into an application package and for providing the application package to the mobile device 200 when the mobile device 200 is connected to the server 100. The mobile device 200 may be any type of portable or handheld device, such as a smart phone, a tablet computer, a PDA (Personal Digital Assistant), a laptop computer or a tablet computer, but it is not limited thereto. The server 100 and the mobile device 200 may communicate with each other via the network 300, such as wired or wireless network.

The editor 34 is used for generating the first application, wherein the editor 34 may provide an editing user interface to configure or edit to generate the first description information which contains the user interaction description information of the user interface and/or other description information which may contain the view description information and the resource description information of the first application. In this embodiment, the first application is written by a platform-neutral language.

The editor 34 may provide an application development service by an editing user interface. In some embodiments, the editor 34 may be a what-you-see-is-what-you-get (WYSIWYG) editor which allows users (e.g. the application publishers or developers) to design the user interface presentation of the application such as the view and the user interaction of the application and configure the corresponding functionalities via drag and drop, wherein templates for frequently used components of a mobile application may further be provided for users to apply to the content. Therefore, the user can design his/her view and user interactions of the user interface of applications and the content of applications via the WYSIWYG editor.

Furthermore, the editor 34 may further include an application editor, a knowledge database and a platform-neutral language generator. The application editor may provide an editing user interface for the user to design the view, the user interaction, the corresponding resources, the corresponding functionalities and so on of the user interface of the first application. The platform-neutral language generator may then convert the content generated and edited by the application editor to a platform-neutral application. The user may further refer to the knowledge database to configure device preference corresponding to each event/action. In some embodiments, the knowledge database may be a device feature policy knowledge database.

The aforementioned user interaction description information, the view description information and the resource description information which are inputted to the converter 36 may be used to determine the user interaction means of the user interface within the application to be developed, e.g. a specific input or output means is corresponded to which sensor or signal, and then determine whether the sensors or provided signals described in the device feature information match to the user interaction of the user interface of the first application according to the device feature information of the mobile device 200. If the mobile device 200 does not construct the device feature information in advance, the mobile device 200 may detect sensors and/or signals that can be provided on the mobile device 200 through the converter 36 or another detection program. For example, assume that the user interaction description information comprises a shaking input means performed by shaking the mobile device 200, the converter 36 or another detection program detects whether any device that supports the shaking input means exists on the target device and records the detection result in the device feature information. If so, the converter 36 may directly utilize the original user interaction description information, view description information and resource description information to convert the first application into the second application executable by the mobile device 200 according to the platform information of the mobile device 200 (e.g. obtained from the version information of the OS, platform or application of the mobile device). For example, if the platform of the mobile device 200 is an Android platform, the converter 36 may convert the first application to an application presented by a programming language in compliance with the Android platform, i.e. the second application. When any of the sensors or signals that can be used to provide input/output operations on the mobile device 200 does not match with the interaction design of the user interface of the first application, the converter 36 may further modify the user interaction description information according to some transformation rules or may allow the user of the mobile device to manually select and modify the user interaction to be replaced, modify the first description information to change the user interaction of the user interface of the application and then convert the application with a modified first description information to the second application which is executable by the mobile device 200. The converter 36 may obtain the transformation rules from a knowledge database, wherein the knowledge database records relevant sensors of the user interface which correspond to the current user interaction or the sensors that can be utilized as input/output signals. The knowledge database further stores a number of transformation rules, such as alternative strategies when a specific sensor or signal of device feature is absent. These alternative strategies may be set as defaults or in advance or may be configured by the user via a user interface.

In some embodiments, the server 100 may pack the converter 36 and the first application into an application package. When the mobile device 200 is connected to the server 100, the application package may be downloaded and installed on the mobile device 200. When the application package is installed on the mobile device 200, the first application may be converted to the second application by the converter of the application package according to the device feature and platform information of the mobile device 200.

In some embodiments, the first application may further consist of three kinds of description information: first description information (user interaction file describing the user interaction of the application), view description information (view file describing the view of the first application) and resource description information (manifest files containing the information about relevant resources). In addition, the database may further include the information of all possible relevant device features that the first application may use for detecting the device features corresponding to the first application on the mobile device 200. The device features may be interaction functions supported by the mobile device, including input means, such as touch input, speech recognition, phone shake and so on, and output means, such as display screen, voice, phone vibration and so on, but it is not limited thereto. When the first application has been read and executed, the converter 36 may detect possible device features within the mobile device 200 according to the knowledge database and the first description information and record the detection result to generate device feature information. Thereafter, the converter 36 may perform a device-oriented user interaction transformation to convert the user interaction described by the user interaction file into specific user interface tailored for the capability of the mobile device 200 according to the device feature information and the transformation rules from the policy knowledge database (not shown) included in the database.

Figure 5A:
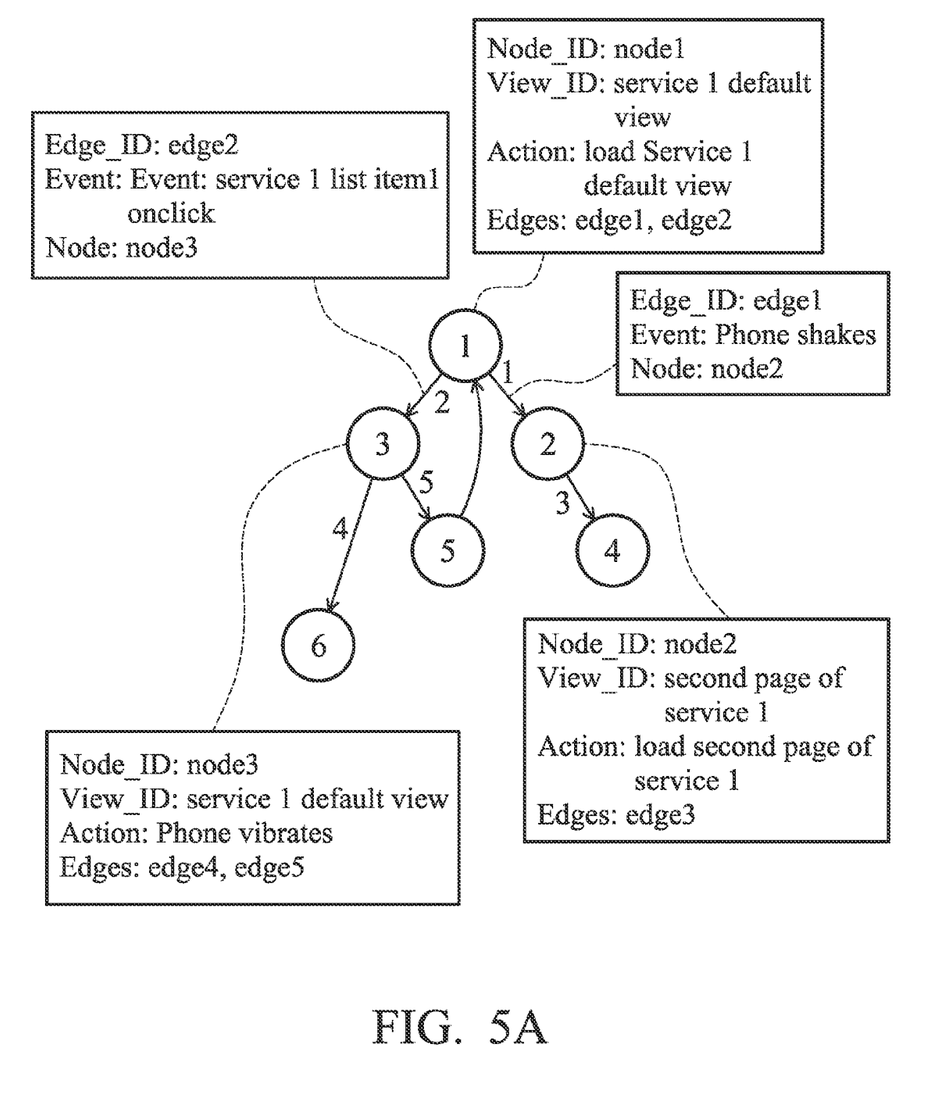
FIG. 5A is a schematic diagram illustrating an embodiment of an user interface file of the invention.

FIG. 5A is a schematic diagram illustrating an embodiment of a user interaction file of the invention. In this embodiment, the user interaction of the user interface of the application is presented in Finite-State Machine (FSM) diagrams, but the invention is not limited thereto. In the FSM shown in FIG. 5A, each node represents an action and status of the application and each edge represents occurrence of a specific event. Each node consists of a node name "Node_ID", a view name "View_ID", actions "Action", and a group of edges "Edges". Each edge consists of an edge name "Edge_ID", an event "Event" and a destination node "Node". Referring to FIG. 5A, Node1 represents the node with its node name "Node_ID" is node1, Node2 represents the node with its node name "Node_ID" is node2, and so on. As shown in FIG. 5A, the node with its Node_ID node1 has its view APP service 1 default view and its action of load APP service1 default view while the node with its Node_ID node2 has its view the second page of APP service 1 and its action of load the second page of APP service1. The edge with ID edge1 is corresponded to the phone shake event and when the phone is shaken at node1, it will transfer to node2 and the view will switch to display the second page of APP service 1.

Figure 5B:
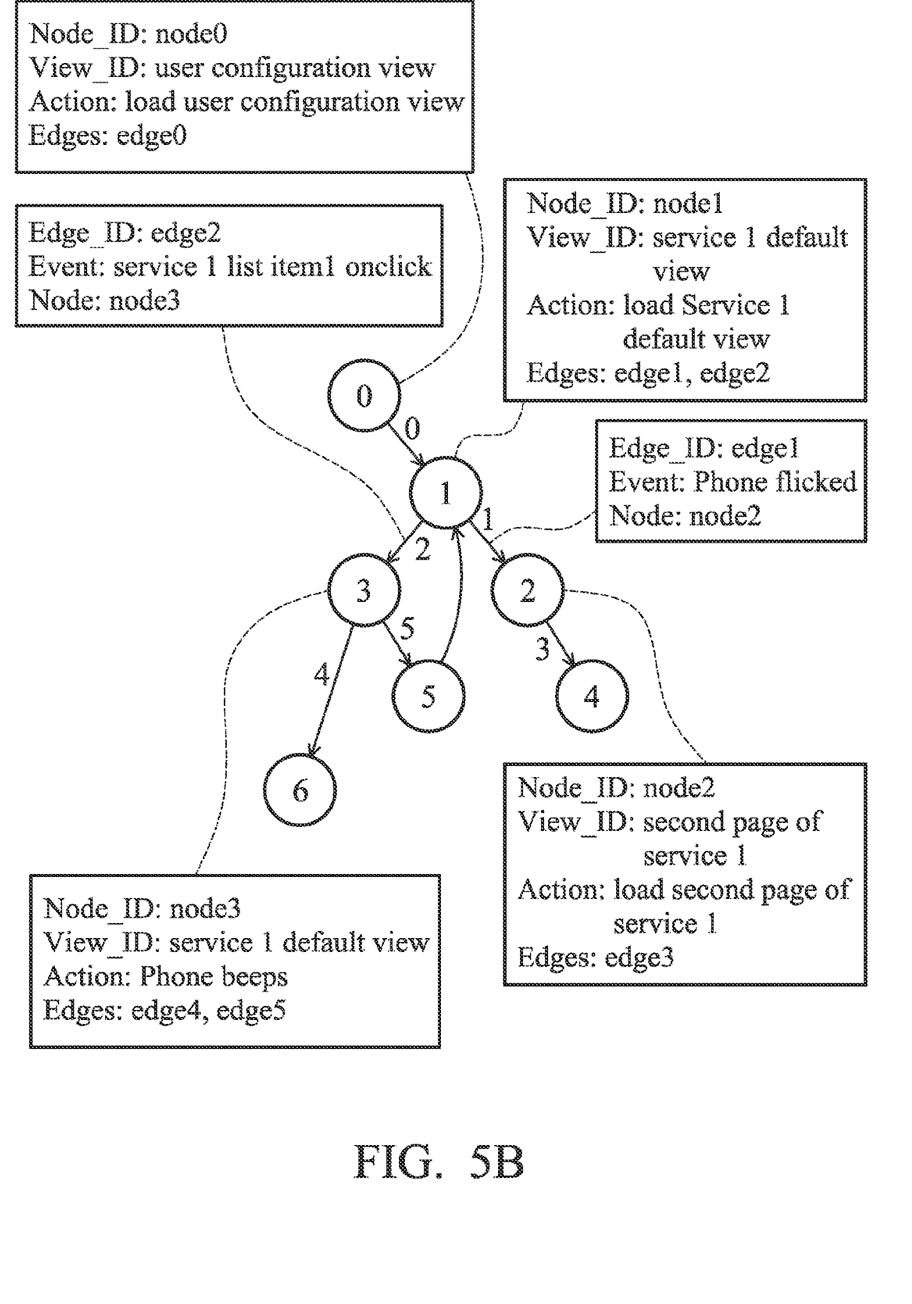
FIG. 5B is a schematic diagram illustrating an embodiment of the interaction means of the user interface of the invention after the fitting device adaption has been performed.

FIG. 5B is a schematic diagram illustrating an embodiment of the interaction means of the user interface of the invention after device-oriented user interaction transformation. In this embodiment, it is assumed that original user interaction of the user interface is illustrated as FIG. 5A. Assume that the application is transmitted to a mobile device that does not support phone shake and phone vibration. Thus, after device feature detection, these two features will be found non-supported. The user interaction file of the application will then be transformed to the FSM as shown in FIG. 5B, wherein a node Node0 is added to the state machine as a new application entry point that can provide a configuration view for informing the user which default user interactions of the application are not supported by the mobile device and for the user to select alternative supported features when a device feature is absent. For example, in this embodiment, FIG. 5B illustrates that the phone flick and phone beep are chosen alternatives to replace phone shake and phone vibrate. In other words, referring to FIG. 5B, when this application starts at node 1 and the phone is flicked, the second page of APP service 1 will be loaded and displayed as the view of the application. When the application starts at node 1 and the APP service 1 item 1 is clicked, the state of the application will transfer to node Node3 so that the displayed screen still displays APP service 1 default view and the phone will beep to replace the phone vibration that is originally configured by the application.

It is understood that the converted or modified user interaction description file and original view and resource description files are a modified first application, and thus the converter has to convert those files (i.e. the modified first application) to an executable application that can be executed in the platform of the mobile device (i.e. the second application).

The transformation rules included in the knowledge database may be set in advance and/or may automatically be set and updated by learning. For example, the transformation rules may be provided from relevant expertise, defined/updated by the user, or may be automatically established according to the user preference. In another embodiment, the transformation rules provided by relevant expertise may further be adjusted/updated according to the user preference. In some embodiments, the user may configure the user preference via a user interface, wherein the user preference can be recorded in the database for reference by another second application executed on the mobile device and/or it may be transmitted to the server and recorded in a database at the server side while the server is connected thereto for serving as a conversion reference for other mobile devices. In other embodiments, the user may not need to input the user preference and the converter 36 may perform an auto conversion according to the user interaction preference statistics recorded in the database at the mobile device side and/or recorded in the database at the server side.

Furthermore, a number of modes for application publication can further be provided, such as one is a standalone packing mode and the other is a bookshelf mode.

In an embodiment of the standalone packing mode, the application package containing the first application and the converter 36 may first be downloaded to the target mobile device 200 and the converter 36 automatically modifies the user interaction of the user interface to match to the device features of the target mobile device 200 when installed on the target mobile device 200. In this embodiment, the server 100 may also be referred to as a cross-platform development server, the converter 36 may also be referred to as a platform-aware interpreter and the application package may also be referred to as a platform-aware application package.

Figure 6:
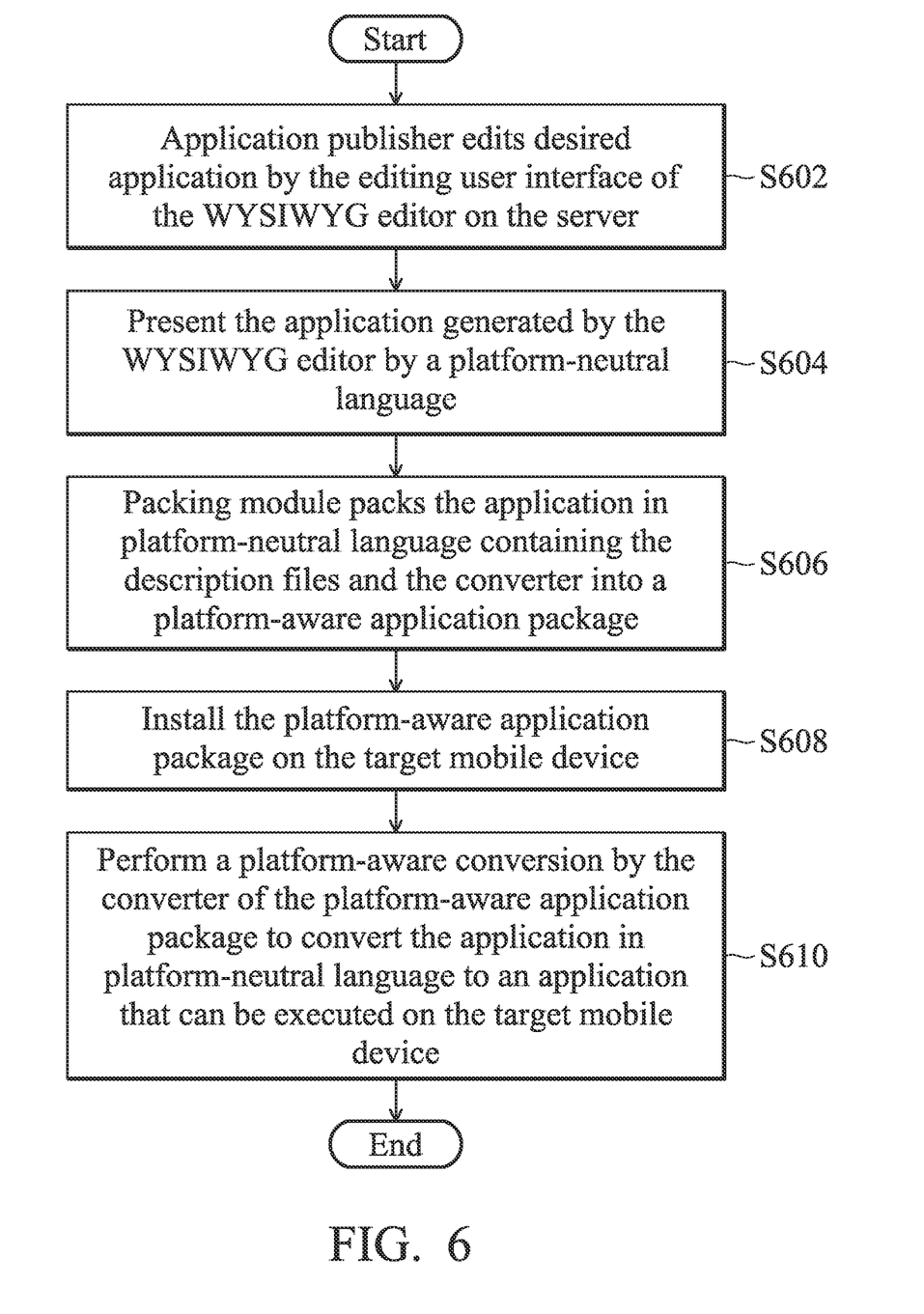
FIG. 6 is a flowchart of another embodiment of a conversion method of applications of mobile devices of the invention, suitable for use in a server that is connected to a mobile device.

In some embodiments, development and conversion of the applications can further be integrated together, as shown in FIG. 6. FIG. 6 is a flowchart of another embodiment of a development and conversion method of applications of mobile devices of the invention, suitable for use in a server that is connected to a mobile device. The development and conversion method of applications of mobile devices can be performed by the mobile device 200 shown in FIG. 4.

First, in step S602, the application publisher may edit desired application by the editing user interface of the WYSIWYG editor on the server.

After the editing is completed, in step S604, the application generated by the WYSIWYG editor is presented by a platform-neutral language, wherein the application in platform-neutral language is also referred to as the first application which consists of the user interaction description file describing the user interaction, the view description file describing the visual appearance/view of the application and the resource description file describing the resources of the application. Thereafter, in step S606, the packing module (or packing agent) 38 packs the application in platform-neutral language containing those description files and the converter 36 into a platform-aware application package. Therefore, the platform-aware application package contains the application in platform-neutral language and the converter 36. The user may then connect its mobile device 200 to the server to download and install the platform-aware application package on the mobile device 200. In step S608, the platform-aware application package is installed on the target mobile device 200 and in step S610, aforementioned conversion is performed by the converter 36 of the platform-aware application package to convert the application in platform-neutral language to an application that can be executed on the target mobile device 200, i.e. the second application.

Since the application in platform-neutral language is platform-neutral, the converter 36 may further convert the platform-neutral language to a programming language which is in compliance with the platform on the mobile device 200, such as converting the application to a corresponding application which is in compliance with iPhone or Android system platform.

In another embodiment, the server 100 may acquire device feature information from the target mobile device 200 and then directly generate/find the application matched to the device features (i.e. the second application) according to the obtained device feature information. After the application that is matched to the device features has generated/found, it may further be transmitted to the target mobile device 200. The server 100 may further include a device feature information acquiring module (not shown) for acquiring the device feature information and platform information from the mobile device 200.

In this embodiment, the platform-aware transformation is performed by the server 100, wherein the server 100 may directly generate the application matched to the device features and the platform of the mobile device 200 according to the user selection. In some embodiments, the mobile device 200 may first connect to the server 100 such that the server 100 may acquire device feature information and platform information from the mobile device 200 to know supported device features for the mobile device 200 and then convert the user interaction of the application described by the application in platform-neutral language (i.e. the first application) to the application (i.e. the second application) matched to the device features corresponding to the platform of the mobile device 200. Thereafter, the server 100 may further transmit the application matched to the device features to the mobile device 200.

In some embodiments, when the server 100 or the mobile device 200 is converting the application matching to the device features, a screen may further be displayed and provided for the user to select alternative features, and the user interaction described by the application in platform-neutral language can be converted according to the chosen alternative features by the user to generate the application matched to the device features and the platform of the mobile device 200.

In an embodiment of the bookshelf mode, the target mobile device 200 may already contain the converter, and it may only download the application that contains the application in platform-neutral language (i.e. first application) and then automatically convert the user interaction of the user interface defined in said application by the converter within the target mobile device 200 to match to the device features of the target mobile device 200.

In this embodiment, the converter may be downloaded and installed when the mobile device 200 connects to the server 100 at first time or it may be installed into the mobile device 200 when the mobile device 200 downloads the application package for the first time. Thereafter, the mobile device 200 may only download or update a portion of the application in platform-neutral language (i.e. the first application) needed rather than downloading the converter or entire application package every time.

Therefore, the application conversion methods of the invention can easily be used by application developers to design desired applications regardless of whether different devices may have different user interface interactions. In addition, the first application of the invention is presented by a platform-neutral language such that the second application generated can be automatically converted to match to the platform language for different devices to easily deliver and update applications, thus efficiently reducing the expertise requirement for cross-platform development and shortening the time and cost needed for application development. Moreover, with the converter of the invention, the application can be automatically converted to the application that is tailored to various target mobile devices according to the hardware device feature information of each mobile device and can adapt the user interaction according to a user configuration, thus not only saving the task and effort required for developing the application for different mobile devices, but also potentially improving user experience and increasing fun for use.

Conversion methods of applications of mobile devices, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A conversion method of applications of mobile devices, comprising:
   obtaining a device feature information and a platform information of a mobile device; and
   modifying, by a convertor, a first description data of a first application according to the obtained device feature information and platform information and converting the modified first application to a second application,
   wherein the first application is represented by a platform-neutral language and at least includes the first description data describing the interaction design of a user interface, and the second application is represented by a language corresponding to the platform information and can be executed to generate the user interface on the mobile device,
   wherein the modifying step further comprises modifying the interaction design of the user interface according to hardware that the mobile device equipped indicated by the obtained device feature information, and
   wherein when the mobile device does not support a first interaction functionality in the interaction design of the user interface, modifying the interaction design of the user interface by replacing the first interaction functionality with a second interaction functionality that supported by the mobile device.

2. The conversion method of claim 1, wherein the conversion method is applied on a mobile device which is connected to a server and the step of obtaining the device feature information and the platform information of the mobile device is performed by the mobile device, wherein the converter and the first application are transmitted from the server to the mobile device, and the mobile device executes the converter to modify the first description data and convert the first application to the second application.

3. The conversion method of claim 1, wherein the conversion method is applied on a mobile device which is connected to a server and the step of obtaining the device feature information and the platform information of the mobile device is performed by the mobile device, wherein the obtained device feature information and the platform information of the mobile device are transmitted to the server, and the server executes the converter to modify the first description data and convert the first application to the second application and transmits the second application to the mobile device.

4. The conversion method of claim 1, wherein the conversion method is applied on a mobile device which is connected to a server and the step of obtaining the device feature information and the platform information of the mobile device is provided by the mobile device, wherein the mobile device further detects and generates the device feature information when the mobile device does not contain the device feature information.

5. The conversion method of claim 1, wherein the converter further modifies the first description data based on the device feature information, the platform information and a conversion rule.

6. The conversion method of claim 1, wherein the converter further modifies the first description data based on the device feature information, the platform information and an interaction preference information.

7. The conversion method of claim 1, wherein the first application further includes an appearance description data and a resource description data corresponding to the user interface for describing a visual appearance corresponding to the first application and a resource corresponding to the first application, respectively.

8. The conversion method of claim 1, further comprising:
generating the first application that contains the first description data by using a what you see is what you get editor (WYSIWYG editor).

9. A mobile device, capable of converting applications thereof, comprising:
a communication module for connecting to a server via a wireless communication network; and
a controller for obtaining a device feature information and a platform information of the mobile device, receiving a converter and a first application containing a first description data from the server via the communication module, executing the converter to modify the first description data of the first application according to the obtained device feature information and platform information, and converting the modified first application to a second application,
wherein the first application is represented by a platform-neutral language and at least includes the first description data describing the interaction design of a user interface, and the second application is represented by a language corresponding to the platform information and can be executed to generate the user interface on the mobile device, and wherein the interaction design of the user interface is modified according to hardware that the mobile device equipped indicated by the obtained device feature information, and wherein when the mobile device does not support a first interaction functionality in the interaction design of the user interface, modifying the interaction design of the user interface by replacing the first interaction functionality with a second interaction functionality that supported by the mobile device.

10. The mobile device of claim 9, wherein the converter further modifies the first description data of the first application based on the device feature information, the platform information and a conversion rule.

11. The mobile device of claim 9, wherein the converter further modifies the first description data based on the device feature information, the platform information and an interaction preference information.

12. The mobile device of claim 9, wherein the first application further includes an appearance description data and a resource description data corresponding to the user interface for describing a visual appearance corresponding to the first application and a resource corresponding to the first application, respectively.

13. The mobile device of claim 9, wherein the server further packs the converter and the first application into an application package and transmits the application package to the mobile device.

14. A system, capable of converting a mobile device application, comprising:
a communication device for connecting to a mobile device via a communication network for obtaining a device feature information and a platform information of the mobile device; and
a server controlling module for executing a converter to modify a first description data of a first application according to the obtained device feature information and platform information, convert the modified first application to a second application and transmit the second application to the mobile device,
wherein the first application is represented by a platform-neutral language and at least includes the first description data describing the interaction design of a user interface, and the second application is represented by a language corresponding to the platform information and can be executed to generate the user interface on the mobile device, and wherein the interaction design of the user interface is modified according to hardware that the mobile device equipped indicated by the obtained device feature information and, and wherein when the mobile device does not support a first interaction functionality in the interaction design of the user interface, modifying the interaction design of the user interface by replacing the first interaction functionality with a second interaction functionality that supported by the mobile device.

15. The system of claim 14, wherein the converter further modifies the first description data of the first application based on the device feature information, the platform information and a conversion rule.

16. The system of claim 14, wherein the converter further modifies the first description data based on the device feature information, the platform information and an interaction preference information, and the interaction preference information is transmitted to the system from the mobile device.

17. The system of claim 14, wherein the first application further includes an appearance description data and a resource description data corresponding to the user interface for describing a visual appearance corresponding to the first application and a resource corresponding to the first application, respectively.

18. The system of claim 14, further comprising:
an editor to provide an user interface to a user to edit and generate the first application and the first description data.

19. A mobile application development system for generating an application and providing the application to a mobile device, comprising:
a communication device for connecting to the mobile device via a communication network;
an editor for generating a first application, wherein the first application is represented by a platform-neutral language and at least includes the first description data describing the interaction design of a user interface; and
a converter for modifying the first description data of the first application according to a device feature information and a platform information of the mobile device and converting the modified first application to a second application, wherein the second application is represented by a language corresponding to the platform information and can be executed to generate the user interface on the mobile device, and wherein the interaction design of the user interface is modified according to hardware that the mobile device equipped indicated by the obtained device feature information, and wherein when the mobile device does not support a first interaction functionality in the interaction design of the user interface, modifying the interaction design of the user interface by replacing the first interaction functionality with a second interaction functionality that supported by the mobile device.

20. The mobile application development system of claim 19, further comprising:

a packing module for packing the converter and the first application into an application package for the mobile device to access when the mobile device is connected to the mobile application development system.

* * * * *